Oct. 14, 1941.  J. C. FORTUNE  2,258,887
STUFFING BOX
Filed Feb. 5, 1940

James C. Fortune.
INVENTOR.
BY
ATTORNEY.

Patented Oct. 14, 1941

2,258,887

UNITED STATES PATENT OFFICE 2,258,887

STUFFING BOX

James C. Fortune, Houston, Tex., assignor to Reed Roller Bit Company, Houston, Tex., a corporation of Texas Application February 5, 1940, Serial No. 317,270

4 Claims. (Cl. 286—16)

This invention relates to a stuffing box for forming a seal about a rotary drill stem, or similar member, such drill stems being utilized in the drilling of wells.

It is a general object of this invention to provide a stuffing box for the purpose set forth which will be capable of withstanding very high pressures and through which a drill stem or the like having portions of different diameters may be readily moved.

Another object of this invention is to provide a means whereby a drill stem or other member may be lubricated so as to more readily move through the stuffing box.

Another object of this invention is to provide a stuffing box of the type referred to in which the packing elements may be forced into sealing engagement by fluid pressure, but in which they are shaped in a novel manner to provide a more efficient seal and one capable of withstanding higher pressures than those heretofore employed.

Another object of this invention is to provide a sealing member for a pressure actuated stuffing box and to reinforce the same in such a manner as to sustain said member against distortion by excessive pressures tending to leak past said member while permitting said member to be distorted by pressure exerted in a direction tending to seal said member.

Other objects and advantages of this invention will become apparent from the following description, taken in connection with the accompanying drawing, wherein.

Figures 1, 2, 3:
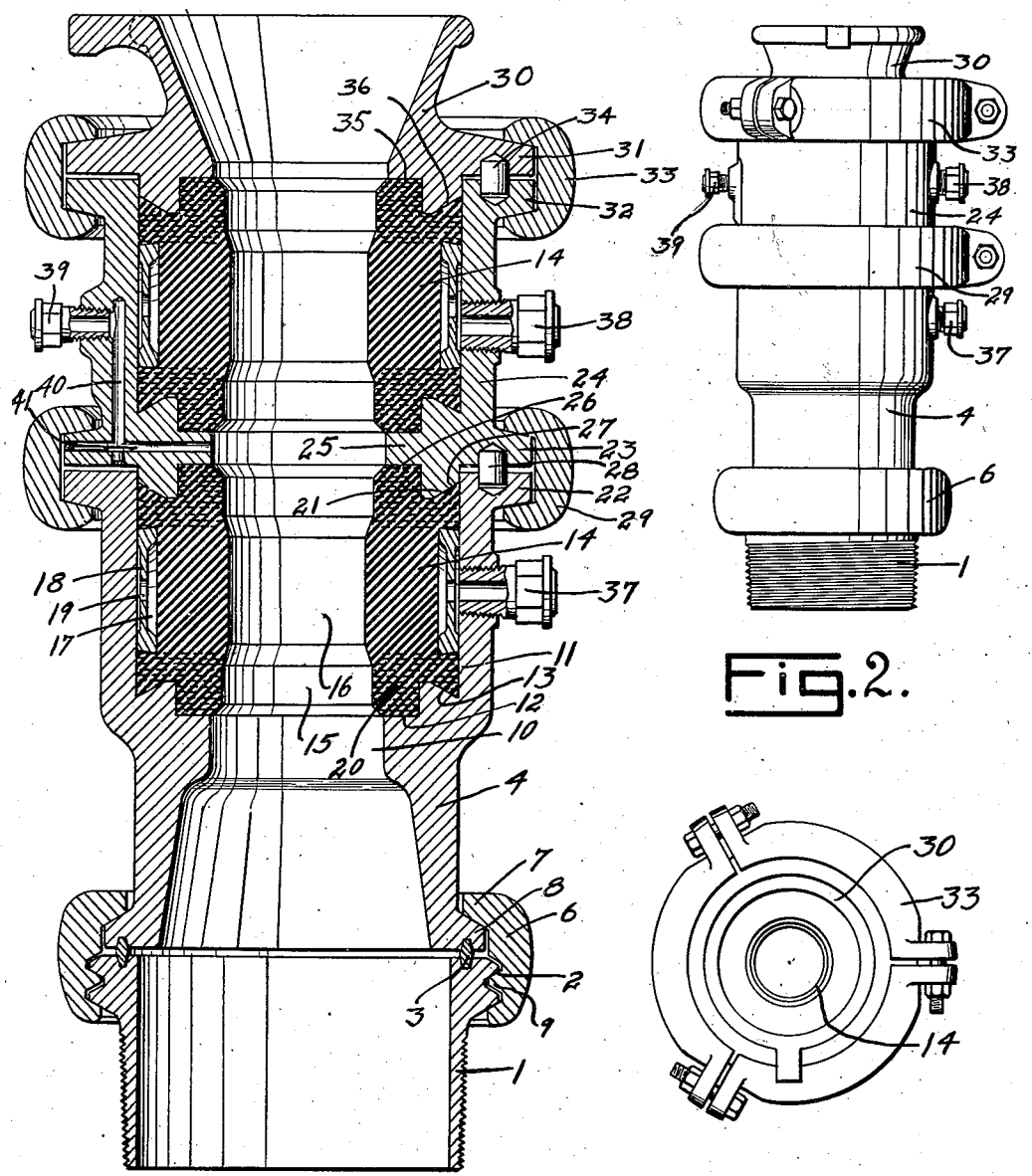
Fig. 1 is a vertical cross section through a stuffing box constructed in accordance with this invention.
Fig. 2 is a side elevation of the same structure.
Fig. 3 is a top plan view of the same structure.

The device is adapted to be connected to the upper end of a casing or surface pipe of a well and for this purpose a special fitting 1 may be employed threaded on its lower end for connection with the casing or surface pipe, and provided on its upper end with a coarse thread 2 forming part of a union.

The upper end of the fitting 1 has formed in its face a groove adapted to receive a metal sealing ring 3.

Above the element 1 is the lower stuffing box 4, having a groove in its lower end adapted likewise to receive the sealing ring 3. A union nut 6, having a part 7 adapted to engage a flange 8 on the body 4, and threads 9 to engage the threads 2 on the fitting 1 is employed for securing these parts together.

The body 4, intermediate its ends, is formed with a part 10 of relatively small inner diameter but of slightly larger diameter than the pipe which is to pass through the stuffing box. The upper end of this body member has a larger diameter, as shown at 11, and between the parts 10 and 11 is an upwardly facing square shoulder 12 and an overhanging upwardly and inwardly inclined shoulder 13.

Within the portion 11 and resting upon the shoulders 12 and 13 is an annular packing element 14, which may be of rubber or other resilient material found suitable for the purpose. This member is tapered from the diameter of the portion 10 of the body 4 to a smaller diameter 15, which is preferably the same as the largest diameter of the member adapted to pass through the stuffing box. The central portion or zone of the element 14 is formed with a still smaller diameter 16, which is preferably either the same size as or slightly smaller than the smallest diameter of the member which is adapted to pass through the stuffing box. It will be seen that the element 14 is relatively very thick walled, and is formed with a channel around its outer periphery, as shown at 17 so that fluid under pressure may be introduced between this member and the adjacent wall of the body 4. Disposed within this hollowed out portion 17 is a spacer ring 18, having openings 19 therethrough so that the fluid under pressure may freely pass to act against the sealing element.

The central portion of the sealing element, that is, the portion opposite the zone 16 and opposite the hollowed out portion 17, is of a resilient material without substantial reinforcement to prevent it from being flexed toward and away from its axis. The opposite end portions of the sealing element 14, however, are reinforced by fabric, or similar material, so as to form annular portions which are relatively quite rigid and able to strongly resist any tendency toward distortion. These end portions will therefore serve as supports for the central portion to resist axial as distinguished from radial movement of the material from this central portion. These reinforced end portions, which are designated by the numeral 20, do not include those relatively small triangular portions 21 which overlie the sloping shoulder 13 and the corresponding part hereinafter to be described, but these parts 21 are instead left soft and pliable for a purpose which will be presently explained.

The body 4, at its upper end, is provided with a flange 22 and overlying this flange 22 is a flange 23 of a second body member 24 adapted to receive a second packing element 14, which is in all respect identical with the first. This body member 24 has an inwardly extending flange 25 providing a downwardly facing shoulder 26 corresponding to the upwardly facing shoulder 12 in the body 4 and a downwardly facing shoulder 27, which is inclined inwardly and downwardly and which corresponds to the upwardly and inwardly inclined shoulder 13. A dowel pin 28, or other suitable means, may be utilized for properly orienting the body members 4 and 24, after which a coupling 29, of any conventional form, may be placed about the flanges 22 and 23 to draw them tightly together.

Now it will be seen that when the flanges 22 and 23 are drawn together, the shoulders 26 and 27 will be moved downwardly toward the packing 14 to tightly engage the same. Inasmuch as the end zones of this packing element 14 are more or less rigid, this engagement may be made very firm. The portion 21, however, being relatively soft and being wedged in between the sloping shoulder 27, the inner wall of the body 4, and the rigid portion of the packing member below it, will serve to form a very effective seal to prevent leakage through the joint between the body members 4 and 24.

Above the flange 25 the body member 25 is identical with the body member 4 above the portion 10, the flange 25 on its upper surface providing shoulders 12 and 13 corresponding to the shoulder of the same number previously described. The upper packing element 14 likewise has a second spacer element 18 and is formed in every way identical with the lower packing element.

It will be appreciated that as many stuffing box units as desired may be added to this assembly one above the other, but for the purpose of this illustration only two such units are employed.

To the upper end of the body member 24 there is secured a reservoir 30. This reservoir 30 is provided with a flange 31 adapted to be clamped to the upper flange 32 of the body 24 by a coupling member 33 in the same manner that the flanges 22 and 23 are secured together. The flanges 31 and 32 may be properly oriented with respect to each other by means of a dowel pin 34, and the element 30 is provided with a downwardly facing radial shoulder 35 and a downwardly and inwardly inclined shoulder 36, corresponding respectively to the shoulders 26 and 27 on the lower end of the body 24. These shoulders 35 and 36 will engage the upper end of the upper packing element 14 with the same purpose and effect that the shoulders 26 and 27 engage the upper end of the lower packing element 14.

The body 4 is provided midway of the part 11 with a tapped opening in which is mounted a fitting 37 and the body 24 is likewise provided midway of its length with a tapped opening for the purpose of receiving the fitting 38, these fittings being for the purpose of conducting fluid under pressure to the interior of the respective body members within the channels 17 of the respective packing elements so as to cause the central portions of these packing elements to be forced radially inwardly into sealing engagement with a member passing through the stuffing box.

The body 24 is also provided with a tapped opening adapted to receive a fitting 39 leading through passageways 40 and 41 to the inner edge of the flange 25 between the two packing elements 14. By means of this fitting and these passageways, a lubricating fluid may be introduced through the packing so that a member passing through the packings may be lubricated in order that it might more readily pass through without tendency to drag the packing with it.

It is noted further that the upper end of the member 30 is provided with a tapered inner surface so that a member passing through the stuffing box may be hung on slips in this taper. The weight of a member so hung will tend to move the member 30 and the body member 34 downwardly and thus assist in properly compressing the respective packing elements 14 in an axial direction during the assembly of the stuffing box and the tightening of the collars 29 and 33. This tapered element 30, however, is primarily for the purpose of forming a reservoir for a lubricant so that when a member is forced through the stuffing box, it will be at all times lubricated just prior to passing through the uppermost of the packing elements 14.

In operation, a member adapted to pass through a stuffing box such as above described would preferably have a minimum diameter substantially the same as the inner diameter of the portions 16 of the packing elements. Thus, the central portion of each packing element will constantly be in engagement with the member even when no pressure is introduced behind these packing elements. However, in order to form a perfect seal against the passage of high pressure, fluid under pressure will be injected through the fittings 37 and 38 to urge the central portions of the packing elements radially inwardly into sealing engagement. It will be appreciated that these central portions can readily move under the influence of such pressure in a radial direction because the central portions of the packings are not reinforced but are substantially flexible. However, they cannot be moved to any substantial degree in an axial direction because the central portion of each of the sealing elements is backed up at its opposite ends by a portion which is made relatively rigid. Thus, provision is made against the extrusion of these relatively pliable central portions of the sealing elements by high pressures.

When the portions of larger diameter of the member passing through the stuffing box engage either sealing element, they will come in contact with the inclined portions joining the ends to the central portions of the sealing members and upon further movement will force the central portions of the sealing members radially outwardly expelling some of the fluid under pressure in the spaces behind the sealing members so that the portions of larger diameter may pass through.

It will be seen from the foregoing that a means has been provided for carrying out all of the objects and advantages sought by this invention.

Having described my invention, I claim:

1. In combination, a housing having a zone of enlarged inner diameter adapted to receive a packing, an annular packing within said housing, said housing being formed with opposed annular shoulders at the ends of said zone adapted to provide abutments for the ends of said packing, one of said ends being formed separately from the remainder of the housing, and means for securing said end to the remainder of the housing, said packing having a relatively flexible intermediate zone and relatively rigid end zones adapted to engage said abutments, and having a flexible annular part adapted to form a seal between the parts of said housing, and a spacer ring interposed intermediate the said end zones and adapted to abut upon the said relatively flexible intermediate zone of said packing and the adjacent wall of the said housing.

2. In combination, a housing having zones of enlarged inner diameter adapted to receive a packing, an annular packing within said housing, said housing being formed with opposed annular substantially radial shoulders at the opposite ends of said zones adapted to provide abutments for the ends of said packing to prevent longitudinal movement thereof, and said housing also being formed with other annular shoulders at its opposite ends, said last mentioned shoulders being inclined inwardly toward the axis of the housing and toward each other to provide means for retaining said annular packing in place, one of the ends of said housing being formed separately from the remainder of the housing, and means for securing said end to the remainder of the housing, said packing having a relatively flexible intermediate zone adapted to be moved radially inwardly to form a seal about a member passing through the stuffing box and having relatively rigid end zones adapted to abut said radial shoulders, to prevent endwise movement of the packing, and a spacer ring interposed intermediate the said end zone and adapted to abut upon the relatively flexible intermediate zone of the said packing and the adjacent wall of the said housing.

3. In combination, a housing having a zone of enlarged inner diameter adapted to receive a packing, an annular packing within said housing, said housing being formed with opposed annular radial extending shoulders at the opposite ends of said zone adapted to provide abutments for the ends of said packing to prevent endwise movement thereof, and said housing being also formed with opposed annular shoulders inclined toward the axis of said housing and toward each other to form a means for retaining the ends of said packing against radial movement within said housing, one of the ends of said housing being formed separately from the remainder of the housing, and means for securing said end to the remainder of the housing, said packing having a relatively flexible intermediate zone adapted to be moved radially inwardly to form a seal about a member passing through the housing, and having relatively rigid end zones adapted to abut said radially extending shoulders, and said packing having relatively flexible annular portions engaging each of said inclined shoulders and forming a seal between the parts of said housing, and a spacer ring interposed intermediate the said end zone and adapted to abut upon the relatively flexible intermediate zone of the said packing and the adjacent wall of the said housing.

4. In combination, an elongated housing having a plurality of spaced zones of enlarged inner diameters, each of said zones adapted to receive a flexible annular packing, said housing being formed with opposed annular shoulders at the ends of said zones adapted to provide abutments for the ends of said packings, one of said abutments being formed separately from the remainder of the housing and means for securing said end to the remainder of the housing, said packings having relatively flexible intermediate zones and relatively rigid end zones adapted to engage said abutments, spacer rings interposed intermediate the said end zones and adapted to abut upon the said relatively flexible intermediate zones of the said packings and the adjacent wall of the said housing, the said flexible annular packings adapted to form a seal between the parts of the said housing, and means for introducing a lubricant through the said housing between said packings.

JAMES C. FORTUNE.